Dec. 3, 1946.  W. A. LEDWITH  2,411,887
POWER PLANT CONSTRUCTION
Filed April 15, 1944   2 Sheets-Sheet 1

INVENTOR
Walter A. Ledwith
Charles A. Warren
ATTORNEY

INVENTOR
Walter A. Ledwith
Charles A Warren
ATTORNEY

Patented Dec. 3, 1946

2,411,887

UNITED STATES PATENT OFFICE 2,411,887

POWER PLANT CONSTRUCTION

Walter A. Ledwith, Hartford, Conn., assignor to United Aircraft Corporation, East Hartford, Conn., a corporation of Delaware Application April 15, 1944, Serial No. 531,307

14 Claims. (Cl. 123—46)

This invention relates to a power plant in which a number of engine-and-compressor units supply hot gas under pressure for use in a turbine or other motor.

The copending application of Hooker, Serial No. 531,302, filed April 15, 1944, shows a structure in which the exhaust collector is nested within the scavenge tank, so that the cooler scavenge tank forms the pressure carrying element and acts as a heat shield around the exhaust collector. A feature of the present invention is an arrangement of the engine-and-compressor unit so that the exhaust duct is enclosed within the scavenge passages and ducts between the exhaust ports and the exhaust collector. In this way the entire exhaust system is enclosed by the scavenge system.

A feature of this invention is the complete shielding of the exhaust system extending from the engine exhaust ports to the burner by the substantially cooler scavenge system which forms an integral part of the power plant. In this way, any heat radiation from the exhaust system will be absorbed by the scavenge gas and will not be lost.

Other objects and advantages will be apparent from the specification and claims, and from the accompanying drawings which illustrate an embodiment of the invention.

Figure 1:
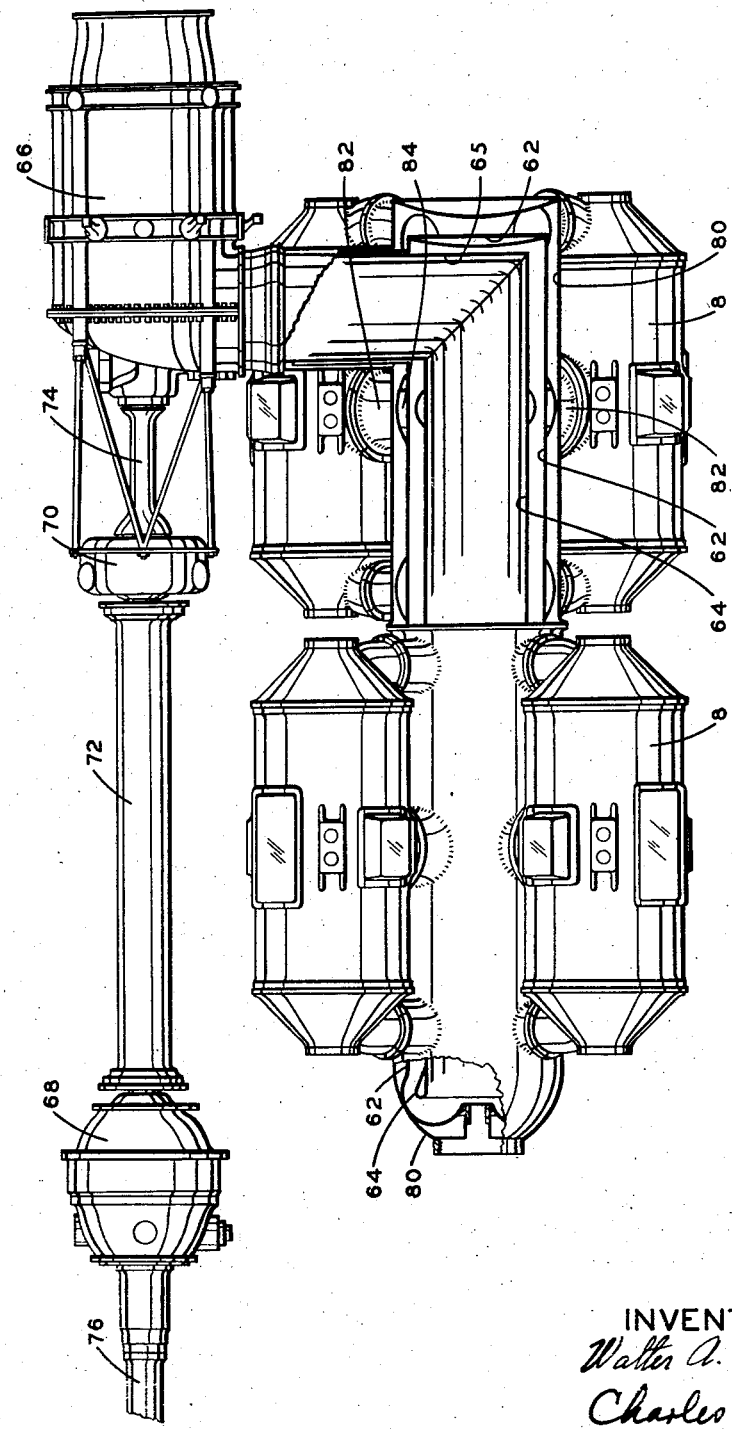
Fig. 1 is a view of the power plant with the scavenge and exhaust collectors partly in section.
Figure 2:
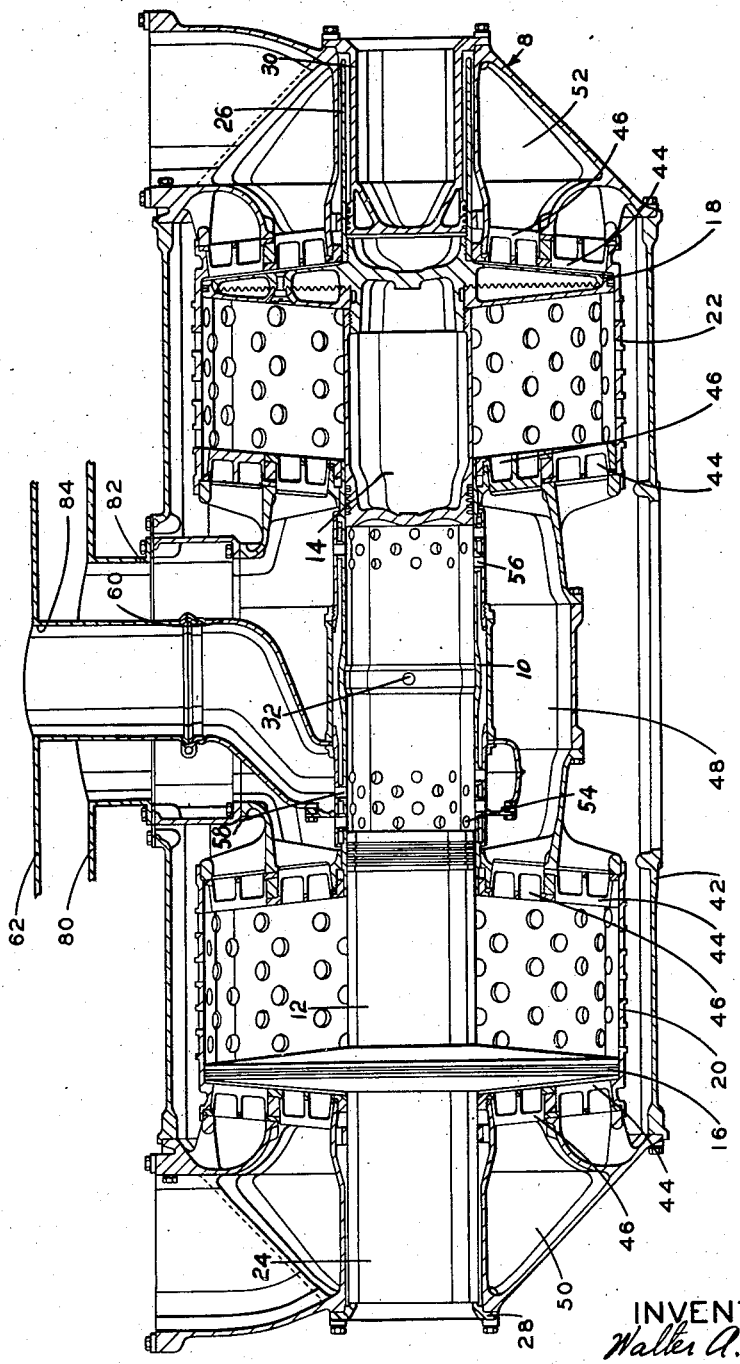
Fig. 2 is a sectional view through one of the engine-and-compressor units.

Each unit 8, as shown in Fig. 2, includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves in combination with stationary pistons 28 and 30 form air spring cylinders.

The piston assemblies are moved apart by the burning of fuel injected into engine cylinder 10 through one or more nozzles 32. Air compressed in the air spring cylinders on the power stroke returns the piston assemblies. The assemblies are always maintained at equal distances from the center of the engine cylinder by a linkage, not shown.

Intake manifold 42 which extends around the compressor and engine cylinders, conducts air to intake valves 44 in the heads of the compressor cylinders through which air alternately enters opposite ends of the cylinders. The compressed air leaves the cylinders through discharge valves 46, also at opposite ends of the compressor cylinders and passes into a central scavenge manifold 48 and end scavenge chambers 50 and 52. These chambers may be interconnected by a scavenge collector 80, as will be described.

Compressed gas from the scavenge chambers enters engine ports 54 and 56 which are uncovered by pistons 12 and 14 at the end of the power stroke, thereby permitting air to be blown through the engine cylinder. Gas in the engine cylinders is discharged through exhaust ports 58 into exhaust manifold 60. The exhaust ports are between the scavenge ports 54 and 56.

Exhaust gas from the generators is discharged into an exhaust collector 62 to which the exhaust manifolds 60 are connected. In the arrangement shown the generators are arranged in groups of four, substantially uniformly spaced about the collector, the groups being longitudinally spaced from each other along the collector. In this way the collector is located centrally through each of the groups of generators. Gas from the exhaust collector passes through a burner duct 64, the discharge end of which is connected by a duct 65 to the inlet of a turbine 66 or other receiver for the hot gases. If the power plant is used for aircraft the turbine may be connected through gear reduction units 68 and 70 and shafts 72 and 74 to a shaft 76 on which a propeller system may be mounted.

The burner 64 and the duct 65 from the end of the burner to the turbine are entirely enclosed within the exhaust collector 62. Thus, any heat radiating from the burner is absorbed by the gas in the collector surrounding the burner. The burner duct, being surrounded by a lower temperature gas at substantially the same pressure may be made of relatively thin material since it does not carry any pressure loads. The arrangement of the generators around the burner, and the arrangement of the burner within the duct are claimed in the copending Kalitinsky application, Serial No. 531,303, filed April 15, 1944.

In the arrangement shown, the exhaust collector is surrounded by a scavenge collector 80 which receives the scavenge gas from the generators at a pressure slightly higher than the pressure in the exhaust collector. The gas in the scavenge collector is relatively cooler than the enclosed exhaust collector and the scavenge collector which is also cooler may be the pressure carrying member for the entire burner assembly which includes the burner and the nested exhaust and scavenge collectors.

The scavenge gas within the collector acts to cool the outer surface of the exhaust collector and thus any heat radiating from the exhaust collector is absorbed by scavenge gas and is not lost. By the nested arrangement both the burner duct and the exhaust collector may be relatively thin shells carrying substantially no pressure load and the material of the scavenge collector which is relatively cool need not be of a heat resistant alloy to withstand the pressures to which it will be subjected. The nesting of the exhaust collector inside the scavenge collector is claimed in the copending Hooker application, Serial No. 531,302, filed April 15, 1944.

As shown in Fig. 2, the central scavenge manifold 48 which is connected directly to a flanged connection 82 on the scavenge collector provides communication with the discharge valves 46 and also with the scavenge ports 54 and 56 in the engine cylinder. This chamber extends around the engine cylinder as shown and completely encloses the exhaust manifold 60 which extends through the flanged opening 82 and is connected to an opening 84 in the exhaust collector 62. By this arrangement the entire exhaust manifold may be of relatively thin material and need not be heavy enough to carry high pressure loads since the scavenge pressure is slightly higher than the exhaust pressure. Moreover, heat radiating from the exhaust manifold 60 is absorbed by the gas in the scavenge manifold and is not lost. The exhaust manifold extends between the inner heads of the compressor cylinders and forms a structural part of the generator to maintain the axial spacing of the inner cylinder heads and to resist the gas forces on these heads.

It is to be understood that the invention is not limited to the specific embodiment herein illustrated and described, but may be used in other ways without departure from its spirit as defined by the following claims.

I claim:

1. A scavenge collector, and an exhaust collector within the scavenge collector, in combination with an internal combustion engine having a scavenge manifold, and an exhaust manifold within the scavenge manifold, said scavenge and exhaust manifolds being connected respectively to the scavenge and exhaust collectors.

2. A scavenge collector, and an exhaust collector within the scavenge collector, in combination with an internal combustion engine having an exhaust manifold connected to the exhaust collector, and a scavenge manifold surrounding the exhaust manifold and connected to the scavenge collector.

3. A scavenge collector, and an exhaust collector within the scavenge collector, in combination with an internal combustion engine having an exhaust manifold connected to the exhaust collector, and a scavenge manifold surrounding the exhaust manifold and connected to the scavenge collector, said scavenge manifold surrounding the exhaust manifold from the engine ports to the collector.

4. A scavenge collector, and an exhaust collector within the scavenge collector, in combination with an internal combustion engine having an exhaust connection to the exhaust collector, and a scavenge manifold surrounding the exhaust connection and connected to the scavenge collector.

5. An internal combustion engine having scavenge and exhaust ports, and scavenge and exhaust manifolds for said ports, said scavenge manifold entirely surrounding the exhaust manifold.

6. An internal combustion engine having scavenge and exhaust ports, and scavenge and exhaust manifolds for said ports, said scavenge manifold completely surrounding the exhaust manifold from the engine ports.

7. An internal combustion engine having an engine cylinder, spaced scavenge ports in said cylinder, and at least one exhaust port between the scavenge ports, scavenge and exhaust manifolds connected to the engine cylinder, said scavenge manifold entirely enclosing the exhaust manifold.

8. An internal combustion engine having an engine cylinder, spaced scavenge ports in said cylinder, and at least one exhaust port between the scavenge ports, scavenge and exhaust manifolds connected to the engine cylinder, said scavenge manifold entirely enclosing the exhaust manifold and carrying the gas pressure loads.

9. An internal combustion engine having an engine cylinder, opposed pistons in said cylinder, scavenge ports at opposite ends of the cylinder, and exhaust ports between said scavenge ports, a scavenge manifold for directing gas to the scavenge ports, and an exhaust manifold entirely within the scavenge manifold and connected to the exhaust ports.

10. An internal combustion engine having an engine cylinder, opposed pistons in said cylinder, scavenge ports at opposite ends of the cylinder, exhaust ports between said scavenge ports, a scavenge manifold for directing gas to the scavenge ports, and an exhaust manifold entirely within the scavenge manifold and connected to the exhaust ports, in combination with a scavenge collector connected to the scavenge manifold, and an exhaust collector within the scavenge collector and connected to the exhaust manifold.

11. A free-piston engine-and-compressor unit including an engine cylinder and piston, a compressor cylinder and piston, said pistons being connected together, scavenge ports in said engine cylinder, discharge valves in the compressor cylinder, a scavenge manifold connecting the discharge valves with the scavenge ports, exhaust ports in the engine cylinder, and an exhaust manifold connected to the exhaust ports and entirely surrounded by the scavenge manifold.

12. A free-piston engine-and-compressor unit including an engine cylinder and piston, a compressor cylinder and piston, said pistons being connected together, scavenge ports in said engine cylinder, discharge valves in the compressor cylinder, a scavenge manifold connecting the discharge valves with the scavenge ports, exhaust ports in the engine cylinder, and an exhaust manifold connected to the exhaust ports and entirely surrounded by the scavenge manifold, in combination with a scavenge collector to which the scavenge manifold is connected, and an exhaust collector within the scavenge collector to which the exhaust manifold is connected.

13. A scavenge collector, and an exhaust collector within the scavenge collector, in combination with a number of free-piston engine-and-compressor units, each having scavenge and exhaust ports, a scavenge manifold forming a part of each unit and being connected to the scavenge collector, and an exhaust manifold enclosed within the scavenge manifold and extending from the exhaust ports to the exhaust collector.

14. A free-piston engine-and-compressor unit including an engine cylinder having scavenge and exhaust ports, opposed pistons in said cylinder, and spaced compressor cylinders at opposite ends of the engine cylinder having compressor pistons connected to the engine pistons, said compressor cylinders having intake and discharge valves, in combination with a scavenge manifold forming a structural connection between the compressor cylinders and connecting the discharge valves to the scavenge ports, and an exhaust manifold entirely enclosed by the scavenge manifold.

WALTER A. LEDWITH.